3,642,666
PROCESS OF MAKING HOLLOW BEADS OF A COPOLYMER OF VINYL CHLORIDE AND AN OLEFIN
Herbert Bartl and Frank Wingler, Cologne, Germany, assignors to Farbenfabriken Bayer Aktiengesellschaft, Leverkusen, Germany
No Drawing. Original application Nov. 22, 1967, Ser. No. 684,943. Divided and this application Sept. 14, 1970, Ser. No. 72,212
Claims priority, application Germany, Dec. 7, 1966, F 50,864; Aug. 7, 1967, F 53,160
Int. Cl. C08j 1/14; B01j 13/02
U.S. Cl. 260—2.5 B
4 Claims

ABSTRACT OF THE DISCLOSURE

Hollow beads of a copolymer containing 70–92 parts by weight of polymerized vinyl chloride and 30–8 parts by weight of polymerized ethylene, propylene or a mixture thereof bonded together with an adhesive for said copolymer, said product being useful as packaging material and as insulating material.

CROSS REFERENCE TO RELATED APPLICATION

This application is a division of application Ser. No. 684,943, filed Nov. 22, 1967, now abandoned.

It is already known that one can produce foam plastics or hollow bodies of low specific gravity which are particularly suitable for use as insulating material, e.g. from polystyrene. The ease with which polystyrene undergoes combustion, however, is a considerable disadvantage.

Attempts to employ other polymers for the same purpose, e.g. polyvinyl chloride, fail because polyvinyl chloride is not suitable for the production of foam plastics of low specific gravity owing to its physical properties, even if polyvinyl chloride which contains plasticiser is foamed with the aid of blowing agents.

An object of this invention is to provide a process by which hollow beads may be bonded together to form shaped foam plastics. A further object is to provide difficultly combustible foam plastics having a low specific gravity. Other objects and advantages of the invention will appear hereinafter.

The present invention relates to a process for the production of difficultly combustible foam plastics, in which finely divided copolymers of 70–92 parts by weight of vinyl chloride and 30–8 parts by weight of ethylene and/or propylene are expanded to form hollow beads with the aid of gaseous substances, and the hollow beads are bonded together to form shaped articles with the aid of adhesives, said adhesives being added to the reaction mixture before or after forming hollow beads.

The copolymers preferably contain 80–90 parts by weight of vinyl chloride and 20–10 parts by weight of ethylene and/or propylene. They are produced by the methods of bulk polymerisation and suspension polymerisation in known manner. Substances which are gaseous at room temperature and which are under pressure before the blowing process, liquids which become gaseous at temperatures below 150° C., or compounds which decompose chemically to liberate gases, may be used as blowing agents in known manner. These compounds include organic solvents such as methyl chloride, methylene chloride, carbon tetrachloride, benzene, methyl acetate, acetone, or mixtures of different types of solvents. By compounds that liberate gases are meant mainly compounds that are capable of decomposing to liberate nitrogen or carbon dioxide at elevated temperature, e.g. $\alpha,\alpha'$-azodiisobutyric acid dinitrile, azodicarbonamide, dinitrosopentamethylene tetramine or benzene-1,3-disulphohydrazide.

The polymers may be mixed with the blowing agents e.g. by swelling in the appropriate solvents. The blowing process is carried out at elevated temperature but below the softening point of the polymers, i.e. below 150° C.

Temperatures below room temperature are of little practical importance. However, the blowing agents may be added to the monomeric vinyl chloride before polymerisation, provided they do not significantly interfere with the progress of polymerisation. Plasticisers, stabilisers, fillers or pigments may also be mixed with the polymers.

It is especially advantageous, however, if the residual monomeric ethylene and vinyl chloride which is contained in the polymer if polymerisation is incomplete is used for expanding the polymer particles immediately after polymerisation.

In this case, vinyl chloride and ethylene are polymerised in a pressure vessel by the method of suspension or block polymerisation until 95% of monomers at the most have been polymerised, and the pressure is then slowly released by a suitable device, e.g. a sufficiently large valve. In this process, hollow beads, such as those described and claimed in copending application Ser. No. 652,434, which may have a specific gravity of 0.1 to 0.01 or less are obtained from the resulting polymer particles. As the hollow beads dry, they may adhere together by forces of adhesion, so that cellular bodies of considerable dimensions can be produced, which are distinguished by their difficult combustibility and their low weight per unit volume (see U.S. patent application Ser. No. 652,434 corresponds to placed open Dutch patent application 6,710,498).

The cellular structures produced in this way, however, have only little mechanical strength and therefore cannot withstand any substantial mechanical stress.

According to the invention, shaped articles of considerable size having low specific gravity and high strength can be produced from the hollow beads if adhesives which cause the hollow beads to stick together are applied to the surfaces thereof. This may be done by mixing the hollow beads with an aqueous phase in which suitable adhesives are dissolved, emulsified or dispersed, and forming plates or other shaped articles from the mixture, and drying them. It is preferred to use the adhesives in the form of emulsions. After the drying process one accordingly obtains shaped articles of high strength.

Furthermore it is possible to introduce the adhesive in the form of a solution, emulsion or dispersion in to the polymerisation vessel after polymerisation has been accomplished and stirring it with the copolymer which is under pressure and has not yet been expanded. The copolymer is subsequently expanded after release of pressure through a sufficiently large valve, the adhesive becoming uniformly distributed over the surface of the hollow beads.

It has been found that in the latter process according to this invention, solutions, emulsions or dispersions of the adhesive can be used which have a higher solids content than may be used if the adhesive is applied to hollow beads that have already been expanded, without the risk of the adhesive being unevenly distributed. Thus solutions, emulsions or dispersions, having a solids content of 40 to 80% by weight, can safely be used whereas according to the first method the solids content which may be used is 0.5 to 15% by weight, preferably 1 to 6% by weight. More dilute solutions, dispersions or emulsions may, of course, also be used but the use of a higher solids content means that a small quantity of solution or dispersing agent need be applied to the hollow beads, this being of great advantage in the subsequent drying process.

Furthermore, it was especially surprising that in the process according to latter method very small quantities of adhesive could be used without any loss in mechanical strength resulting after the drying and shaping process.

The drying process may be carried out at room temperature ($t = 18$–$25°$ C.) or at a temperature below the softening point of the copolymer of the hollow beads, preferably 20 to 60° C.

The hollow beads that are still moist from the water and covered with adhesives can be worked up into foam articles in various ways. After the hollow beads covered with adhesive have been dried by being exposed to air or by fluidised bed drying at temperatures below 80° C., the hollow beads can be bonded together to form shaped articles by the application of pressure, if desired at elevated temperatures below the melting point. Relatively slight pressures of 0.1 to 1 excess atmosphere are sufficient for this purpose. The hollow beads preserve their spherical shape at these pressures and are stuck together only at their points of contact. Foams of very low bulk density, of 5 to 20 grams per litre, can therefore be produced. The hollow beads to which adhesives has been applied may also be shaped into foam articles in the moist state by slight application of pressure of about 0.1 to 1 excess atmospheres with heating, and they are then dried at room temperature or at temperatures below the melting point. Heating may be carried out by means of an air current or by infra-red or microwave heating. Since the hollow beads are only stuck together at separate points, the foam remains permeable to air and dries very rapidly.

Foams of higher density, of 20 to 50 g./l., may also be produced by application of pressures above 1 excess atmosphere. These foams have greater mechanical strength but are no longer so permeable to air.

One may use mainly high molecular weight compounds such as methylcellulose, carboxymethylcellulose, starch, polyacrylic acid or gelatine, and low molecular weight compounds such as melamine resins, dextrins etc., as adhesives. Some of these adhesives, such as methylcellulose, have, however, only limited applicability since the foamed articles produced from them may lose their flame resistance.

It has been found that particularly good adhesion properties are achieved without increase in combustibility if one uses, as adhesive, polymer emulsions of halogen-containing polymers, such as polychloroprene or copolymers of ethylene and vinyl chloride. The copolymers of ethylene and vinyl chloride further have the advantage over polychloroprene that they do not yellow. Suitable ethylene/vinyl chloride copolymers are those in which the vinyl chloride content is about 50 to 70% by weight.

Apart from the above mentioned adhesives, one may also use adhesives made from homopolymers of vinyl esters such as vinyl acetate or vinyl propionate, or of acrylic acid esters having 2 to 20 C-atoms in the ester residue or of 1,3-diolefines such as butadiene or isoprene. In addition, copolymers of the above mentioned monomers, or mixtures of these with ethylene, styrene, vinyl chloride, vinylidene chloride, acrylonitrile or mixtures thereof may be used.

The shaped articles produced contain 6 to 99% by weight, preferably 30 to 90% by weight of hollow beads copolymers and 94 to 1% by weight, preferably 70–10% by weight of bonding agents (100% substance).

The products according to the invention may be used in many different ways, for example as packaging material or as insulating material. The products are preferably employed as insulating material in the building industry in cases where it is important that the foam plastics should be fire-resistant.

One special advantage of the insulating materials produced by the process of the present invention is their permeability to water vapour. Plates of this material may be used as insulating slabs between freshly erected brickwork without any risk of formation of water of condensation for packaging purpose. The elasticity of the foam is especially advantageous. The uniform structure of the foam also enables thin webs a few millimetres in thickness, which can be rolled up, to be cut from larger blocks. These webs may be used as insulating layers, e.g. as linings for wallpapers or as underlays for floor coverings.

Compared with polystyrene foams, the vinyl chloride copolymers according to the invention have much better resistance to solvents, especially to hydrocarbons.

The parts given in the examples are parts by weight unless otherwise indicated.

EXAMPLE 1

1200 parts of water, 2.1 parts of methyl cellulose and 1.083 parts of cyclohexyl peroxydicarbonate are introduced into a 100 atmosphpheres autoclave the volumetric capacity of which is so calculated that 50 to 80% of its volume is filled with the liquid phase during polymerisation. When the air has been displaced by ethylene, 360 parts of vinyl chloride are added and the autoclave contents are then saturated within 20 minutes with 18 excess atmospheres of ethylene at room temperature with stirring (400 to 500 revs. per min.). The autoclave contents are then heated to 50° C. After 24 hours, the contents are left to cool and the polymer is released into a receiver through an ascending pipe. On leaving the outlet valve, the polymer particles expand to form a foam product which is dried in air and freed from coarser particles on a screen of 2 mm. mesh. 255 parts of hollow bodies of density 0.0085 g./cm.$^3$ are obtained which have a vinyl chloride content of 84–86% by weight.

400 cc. of hollow beads are made up into a paste with 100 cc. of a 2.5% aqueous solution of methyl cellulose and formed into a plate of 1 cm. thickness. After drying at about 50° C., a plate of density 0.021 g./cm.$^3$ and high mechanical strength is obtained.

EXAMPLE 2

As in Example 1, 100 cc. = 100 parts of a solution of 1 part of methyl cellulose, 10 parts of waterglass solution of density 1.36 g./cc. and 100 parts of water are mixed with 400 cc. of hollow beads. A plate 1 cm. in thickness is formed and dried at 50° C. in the presence of air. A foam density 0.01 g./cc. is obtained which has better heat resistance than the product of Example 1.

EXAMPLE 3

400 cc. of hollow beads are suspended in 200 cc. of water-glass solution of density 1.36 g./cc. (25% SiO$_2$) and freed from excess solution on a sieve. The hollow body can be formed into plates. After several days storage at room temperature of about 20° C. and access of air, a hard structure of density 0.165 g./cc. is obtained. The foam is resistant to water and incombustible.

EXAMPLE 4

400 cc. of hollow beads are mixed with 50 cc. of 6% aqueous Kaurit glue ® solution to which more than 2 cc. of Kalthärtner ® have previously been added, and the mixture is formed into a plate. (® Trade product of BASF.) After drying at room temperature ($t = 18$–$25°$ C.), a water-resistant, difficulty inflammable shaped article of density 0.021 g./cc. is obtained.

EXAMPLE 5

400 cc. of hollow beads are treated for 10 minutes with 100 cc. of a 3%, chlorine-containing latex (copolymer of ethylene and vinyl chloride containing about 60% by weight of vinyl chloride), and freed from excess latex on a sieve. From the hollow bodies, moulded articles can be produced which after drying at room temperature ($t = 18$–$25°$ C.) have a density of 0.025 g./cc. The foam is not inflammable.

If a 3% polychloroprene latex is used instead of the emulsion of ethylene/vinyl chloride copolymer, practically the same results are achieved.

EXAMPLE 6

4.8 litres of softened water and 8 g. of methyl cellulose are placed into a 10 litre pressure vessel. This is flushed with ethylene, and 4.33 g. of cyclohexylperoxydicarbonate, 1350 g. of vinyl chloride, 50 g. of propane or pentane and 900 g. of ethylene are added with stirring. The reaction mixture is then polymerised for 12 hours at 56° C. and cooled to 28° C., and 600 cc. of a 57% by weight latex consisting of a copolymer of 60% by weight vinyl chloride and 40% by weight of ethylene, based on the dry substances, are introduced under pressure. After the reaction mixtures has been stirred for 5 minutes, the pressure is slowly released through a 6 mm. valve while the stirrer is kept in rotation. The polymer expands to form a foam immediately after leaving the valve. About 400 litres of hollow beads covered with latex are obtained after the release of pressure.

EXAMPLE 7

Example 6 is repeated but with 300 cc. of a 57% by weight latex consisting of a copolymer of 60% by weight of vinyl chloride and 40% by weight of ethylene. After release of pressure, about 400 litres of hollow beads covered with latex are obtained.

EXAMPLE 8

The same procedure is adopted as in Example 6 but a 3 litre pressure vessel is employed and the following quantities are used: 1200 g. of softened water, 2.1 g. of methyl cellulose, 1.08 g. of cyclohexyperoxydicarbonate and 380 g. of vinyl chloride. Ethylene is forced in under pressure at room temperature with stirring until a pressure of 38 excess atmospheres is established in the pressure vessel. Polymerisation is continued for 12 hours at 50° C., and 500 cc. of a 1% by weight solution of methyl cellulose in water is forced in under pressure after the product has cooled to 25° C. The product is briefly stirred and then released into a plate mould through a 4 mm. valve. It is left to dry in the mould at room temperature, and a foam of density 20 g./l. is obtained.

EXAMPLE 9

The polymers from Examples 6 and 7 are dried separately at room temperature in a current of air in the course of three hours, and are then compressed into plates of 3 cm. in thickness at 25° C. and 0.2 excess atmospheres, and heated to 60° C. in a stream of air. By briefly applying pressure (for 15 seconds) of 0.1 excess atmosphere, a firm plate of foam of density 16 or 15 g./l. is obtained.

EXAMPLE 10

The hollow beads from Examples 6 and 7 are heated while still moist to 60° C. with hot air, are pressed into plates of 4 cm. thickness for 15 seconds at a pressure of 0.1 excess atmosphere, and are then dried by storage for 12 hours at room temperature. Bulk density 12 to 16 g./l.

We claim:

1. A process for producing a foam plastic of spherical particles having continuous, hole-free, self-supporting walls bound together with an adhesive which comprises suspension copolymerizing a mixture of vinyl chloride and ethylene in a closed system wherein the liquid phase of said suspension copolymerization occupies 50 to 80% by volume of the total volume of said system, at a temperature between about −30 and +100° C. in the presence of a low temperature reaction initiator and at a vinyl chloride/ethylene pressure of from 30 to 80 atmospheres above atmospheric pressure to a monomer conversion of up to 95% to obtain a copolymer of from 70 to 92 parts by weight of vinyl chloride and 30 to 8 parts by weight of ethylene, introducing the adhesive into said copolymer while under said pressure and then slowly reducing said pressures to atmospheric pressure to obtain said foam plastic.

2. The process of claim 1 wherein the conversion of said monomers is about 20 to 80%.

3. The process of claim 1 wherein propylene in an amount of up to 50% by weight of ethylene monomer is present as additional monomer.

4. The process of claim 1 wherein the adhesive is introduced into said copolymer in the form of a solution emulsion or dispersion.

References Cited

UNITED STATES PATENTS

| 2,797,201 | 6/1957 | Veatch et al. | 260—2.5 B |
| 2,875,186 | 2/1959 | Gerhard et al. | 260—92.8 W |

MURRAY TILLMAN, Primary Examiner

M. FOELAK, Assistant Examiner

U.S. Cl. X.R.

260—8, 17 A, 17.4 ST, 87.3